United States Patent
Chang et al.

(10) Patent No.: US 9,645,450 B2
(45) Date of Patent: May 9, 2017

(54) ALIGNMENT APPARATUS, EXPOSING APPARATUS INCLUDING THE SAME, AND MANUFACTURING METHOD OF LIQUID CRYSTAL DISPLAY DEVICE

(71) Applicant: Samsung Display Co., Ltd., Yongin (KR)

(72) Inventors: Jae Hyuk Chang, Seongnam-si (KR); Hi Kuk Lee, Yongin-si (KR); Cha-Dong Kim, Seoul (KR); Sang Hyun Yun, Suwon-si (KR); Jung-In Park, Seoul (KR); Chang Hoon Kim, Asan-si (KR); Ki Beom Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 637 days.

(21) Appl. No.: 13/871,732

(22) Filed: Apr. 26, 2013

(65) Prior Publication Data

US 2014/0167298 A1     Jun. 19, 2014

(30) Foreign Application Priority Data

Dec. 13, 2012  (KR) .................. 10-2012-0145415

(51) Int. Cl.
*G01B 11/00*       (2006.01)
*G02F 1/1341*     (2006.01)
(Continued)

(52) U.S. Cl.
CPC .......... *G02F 1/1341* (2013.01); *G01B 11/272* (2013.01); *G02F 1/1303* (2013.01);
(Continued)

(58) Field of Classification Search
CPC ..................... G02F 1/1303; G01B 11/272
See application file for complete search history.

(56) References Cited

U.S. PATENT DOCUMENTS 5,570,180 A * 10/1996 Nagai ................. G01J 3/02
356/310
6,525,818 B1 * 2/2003 Yin ................. G03F 9/7069
356/369
(Continued)

FOREIGN PATENT DOCUMENTS

KR       20060038789 A  *  5/2006

OTHER PUBLICATIONS

Jin, Suk Seo, "Method for manufacturing lcd and apparatus therefor", KR 2006-0038789 A, English Translation, May 4, 2006.*

*Primary Examiner* — Galen Hauth
(74) *Attorney, Agent, or Firm* — H.C. Park & Associates, PLC

(57) ABSTRACT

Exemplary embodiments of the invention relate to an alignment apparatus including a source unit providing an electromagnetic signal, a receiving unit detecting the provided electromagnetic signal, and a polarization element positioned between the source unit and the receiving unit and having a transmissive axis fixed in a predetermined direction. A substrate may be positioned between the source unit and the receiving unit, and may be formed with a polarizer including a plurality of metal lines with a minute linear pattern. The luminance or intensity of the electromagnetic signal may be detected by the receiving unit while rotating the substrate.

4 Claims, 10 Drawing Sheets

(51) Int. Cl.
*G02F 1/13* (2006.01)
*G01B 11/27* (2006.01)
G02F 1/1333 (2006.01)
G02F 1/1335 (2006.01)

(52) U.S. Cl.
CPC ............ *G02F 2001/133354* (2013.01); *G02F 2001/133548* (2013.01)

(56) References Cited

U.S. PATENT DOCUMENTS

2008/0074598 A1* 3/2008 Ham .................... G02F 1/1337
   349/129
2010/0007827 A1* 1/2010 Nishimura ............. B82Y 20/00
   349/117

* cited by examiner

ALIGNMENT APPARATUS, EXPOSING APPARATUS INCLUDING THE SAME, AND MANUFACTURING METHOD OF LIQUID CRYSTAL DISPLAY DEVICE

CROSS REFERENCE TO RELATED APPLICATION

This application claims priority from and the benefit of Korean Patent Application No. 10-2012-0145415, filed on Dec. 13, 2012, which is hereby incorporated by reference for all purposes as if fully set forth herein.

BACKGROUND

Field

Exemplary embodiments of the invention relate to an alignment apparatus, an exposure apparatus including the same, and a manufacturing method of a liquid crystal display.

Description of the Background

When performing a plurality of thin film processes on an insulation substrate or a semiconductor substrate, an alignment apparatus for aligning each thin film process may be needed.

In the alignment apparatus, a structure of an alignment key formed on the insulation substrate or the semiconductor substrate is sensed by a camera, and the next thin film process is performed based on the sensed structure.

The thin film process has a nanoscale sensitivity, however a general camera may not have nanoscale sensitivity. Accordingly, an expensive camera may need to be used or the alignment key is formed to be larger than the nanoscale to be sensed by the general camera.

Accordingly, a space occupied by the alignment key may be unnecessarily large relative to the thin film process such that an unnecessary consumption of space occurs, or the cost of the alignment apparatus is increased by the usage of the expensive camera.

With respect to a polarizer used in the thin film process, a metal line of a minute pattern may be used with an interval smaller than a wavelength of light to have a polarization characteristic. The minute pattern of the metal line is very small such that it is difficult to sense the interval therebetween by using the general camera.

When executing the thin film process on the metal line, a misalignment between the metal line of the minute pattern and the overlying thin film process may occur. This is because the metal line is pressed by using a mold to form the minute pattern when forming the metal line of the minute pattern. However, a possibility of an angle deviation is high in the pressing process.

Also, a liquid crystal display (LCD) is manufactured by combining an upper substrate and a lower substrate, and when using the general polarizer, the polarizer may be attached after the upper substrate and the lower substrate are combined such that it is not necessary to consider the alignment.

When using the metal line of the minute pattern as the polarizer, the upper substrate and the lower substrate already include the metal line of the minute pattern and the combination is executed in an aligned state. However, it is difficult to verify the alignment state of the LCD.

The above information disclosed in this Background section is only for enhancement of understanding of the background of the invention and therefore it may contain information that does not form the prior art that is already known in this country to a person of ordinary skill in the art.

SUMMARY

Exemplary embodiments of the invention provide an alignment apparatus capable of being used for aligning a minute linear pattern, an exposure apparatus including the same, and a manufacturing method of a liquid crystal display.

Additional features of the invention will be set forth in the description which follows, and in part will be apparent from the description, or may be learned by practice of the invention.

Exemplary embodiments of the invention disclose an alignment apparatus including a source unit, a receiver, and a polarization element. The source unit is configured to provide an electromagnetic signal. The receiver is configured to receive the electromagnetic signal. The polarization element is positioned between the source unit and the receiver. The polarization element has a transmissive axis fixed in a determined direction. The substrate is positioned between the source unit and the receiver. The substrate is formed with a polarizer including a plurality of metal lines with a linear pattern. Upon the substrate being rotated, at least one of a luminance and an intensity of the electromagnetic signal received by the receiver is determined.

Exemplary embodiments of the invention also disclose an apparatus including an alignment unit and an exposure unit. The alignment unit includes a source unit, a receiver, and a polarization element. The source unit is configured to provide an electromagnetic signal. The receiver is configured to receive the electromagnetic signal. The polarization element is positioned between the source unit and the receiver. The polarization element has a transmissive axis fixed in a determined direction. The exposure unit is adjacent to the aligning apparatus. A substrate is positioned between the source unit and the receiver. The substrate is formed with a polarizer including a plurality of metal lines with a linear pattern. Upon the substrate being rotated, at least one of a luminance and an intensity of the electromagnetic signal received by the receiver is determined. The exposure unit is configured to perform a thin film process on the substrate.

Exemplary embodiments of the invention also disclose a manufacturing method of a liquid crystal display. The method includes forming a first polarizer including a plurality of metal lines of a linear pattern on a first substrate, determining an arrangement direction of the plurality of metal lines to align the first substrate, and forming at least one of a wire and an electrode on the first polarizer of the aligned first substrate. The aligning of the lower substrate includes determining a least one a luminosity and intensity of an electromagnetic signal traversing the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
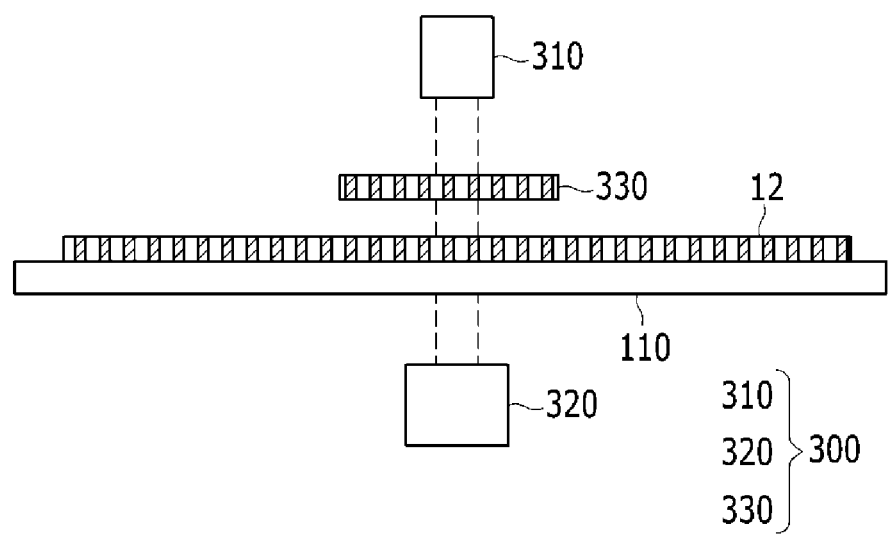
FIG. 1 is a view of an alignment apparatus according to exemplary embodiments of the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. In the drawings, the thickness of layers, films, panels, regions, etc., may be exaggerated for clarity.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, exemplary embodiments of the invention will be described in detail with reference to the accompanying drawings.

FIG. 1 is a view of an alignment apparatus according to exemplary embodiments of the invention.

An alignment apparatus 300 may include a source unit 310, a receiving unit 320, and a polarization element 330.

The source unit 310 may provide an electromagnetic signal at a wavelength band corresponding to a visible ray range, an electromagnetic signal at a predetermined wavelength, or electromagnetic signals at various wavelength bands with reference to a radiation source of a wavelength band of red, green, and blue. For example, in some cases, the source unit 310 may generate and provide ultraviolet rays or infrared rays.

The source unit 310 may direct the electromagnetic signal towards the receiving unit 320.

The receiving unit 320 may include a sensor or camera detecting the electromagnetic signal provided from the source unit 310. Luminance or intensity of the electromagnetic signal may be detected at the receiving unit 320. The receiving unit 320 may also determine various other characteristics of a received electromagnetic signal including, but not limited to, the received wavelength, frequency, and power.

The polarization element 330 may be positioned between the source unit 310 and the receiving unit 320. The polarization element 330 may allow radiation that is linearly polarized in one direction to pass and may prevent radiation that is linearly polarized in a direction perpendicular to the one direction. It should be understood that the one polarization direction may be configurable or adjusted according to the desired polarization settings. The polarization element 330 may be made of a polarization film including polyvinyl alcohol (PVA) and triacetate cellulose (TAC). The polarization element 330 may be formed with metal lines having a minute linear pattern. An interval between the metal lines may be smaller than a wavelength of visible rays (e.g., approximately 390 nm to 750 nm).

In some cases, as shown in FIG. 1, the polarization element 330 may be positioned close to the source unit 310 (e.g., between lower polarizer 12 and the source unit 310). In some cases, the polarization element 330 may be positioned close to the receiving unit 320 (e.g., between lower polarizer 12 and the receiving unit 320).

FIG. 1 shows a lower substrate 110 including the lower polarizer 12. The lower polarizer 12 may include a plurality of metal lines having the minute linear pattern. An interval between the plurality of metal lines may be smaller than the wavelength of visible rays.

As shown in FIG. 1, in some cases, the lower substrate 110 including the lower polarizer 12 may be positioned between the polarization element 330 and the receiving unit 320. If the lower substrate 110 is rotated, the luminance or the intensity of the electromagnetic wave/signal detected at the receiving unit 320 may change. A center axis (hereinafter referred to as a rotation axis) for rotating the lower substrate 110 may be parallel to a line connecting the source unit 310 and the receiving unit 320 or may be parallel to a path of the electromagnetic signal provided from the source unit 310 to the receiving unit 320. The rotation axis may be perpendicular to a horizontal surface of the lower substrate 110 and a horizontal surface of the polarization element 330.

When the luminance or the intensity of the electromagnetic signal detected at the receiving unit 320 is largest, the transmissive axis of the polarization element 330 and the transmissive axis of the lower polarizer 12 are aligned with each other.

The transmissive axis of the polarization element 330 is a determined direction when configuring the alignment apparatus 300 so as to be a direction that is previously known. When the luminance or the intensity of the electromagnetic signal detected at the receiving unit 320 is largest while rotating the lower substrate 110, the transmissive axis of the lower polarizer 12 also has the same direction as the transmissive axis of the polarization element 330 that is previously known.

The transmissive axis of the lower polarizer 12 including a plurality of metal lines having the minute linear pattern may, in some cases, be perpendicular to the direction in which the plurality of metal lines are extended, thereby indicating the extending direction of the metal lines.

As described above, if a thin film process is additionally performed based on the extending direction of the plurality of metal lines of the lower polarizer 12, a misalignment may not be generated between the plurality of metal lines and overlying wires.

The receiving unit 320 may detect and measure the maximum luminance or the maximum intensity or a received electromagnetic signal. However the direction of the metal lines may be determined by measuring a minimum luminance or a minimum intensity.

For example, the luminance or intensity detected by the receiving unit 320 may be a minimum when the transmissive axis of the polarization element 330 and the transmissive axis of the lower polarizer 12 are perpendicular to each other. Therefore, the extending direction of a plurality of metal lines formed in the lower polarizer 12 is a direction parallel to the transmissive axis of the polarization element 330.

In FIG. 1, the lower substrate 110 is shown; however, in some cases, an upper substrate 210 may be used in place of a lower substrate and an upper polarizer 22 may be used in place of the lower polarizer 12.

As described above, the extending direction of the metal line of the lower polarizer 12 may be determined through the alignment apparatus 300 of FIG. 1, and the wires may be formed according to the extending direction of the metal lines without misalignment.

Figure 2:
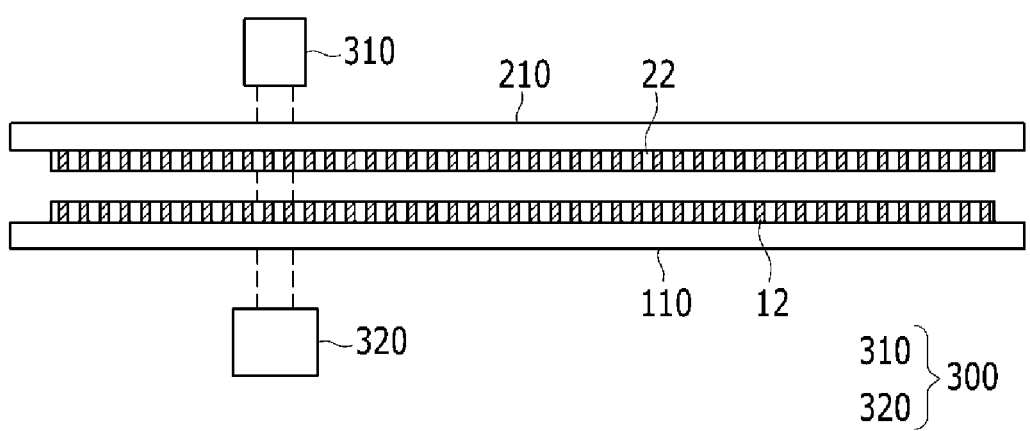
FIG. 2 is a view of an alignment apparatus according to exemplary embodiments of the invention.

In some cases, the alignment apparatus 300 may be used on a combination of the upper substrate 210 and the lower substrate 110 of an LCD, as shown in FIG. 2. The upper polarizer 22 may be previously formed in the upper substrate 210 and the lower polarizer 12 may be previously formed in the lower substrate 110. The upper polarizer 22 and the lower polarizer 12 may include a plurality of metal lines of the minute linear pattern.

A method of determining the polarization direction of the upper substrate 210 and the lower substrate 110 will be described with reference to FIG. 2.

FIG. 2 is a view of an alignment apparatus 300 according to exemplary embodiments of the invention.

As shown in FIG. 2, the upper polarizer 22 and the lower polarizer 12 are respectively formed with the upper substrate 210 and the lower substrate 110, however various wires and electrodes included in the liquid crystal display are formed under the upper polarizer 22 of the upper substrate 210 and on the lower polarizer 12 of the lower substrate 110. The upper substrate 210 and the lower substrate 110 are formed, in some cases, of the same material, and, in some cases, with different materials.

A color filter, a light blocking member, and a common electrode may be formed under the upper polarizer 22 of the upper substrate 210. Also, a gate line, a data line, a thin film transistor, and a pixel electrode may be formed on the lower polarizer 12 of the lower substrate 110. In general, various components of the LCD may be formed under the upper polarizer 22 and on the lower polarizer 12.

The wires and the electrodes formed under the upper polarizer 22 of the upper substrate 210 and on the lower polarizer 12 of the lower substrate 110 may be formed by a thin film process that is performed based on the extending direction of the metal lines of the upper polarizer 22 or the lower polarizer 12 determined by the method described above with reference to FIG. 1.

To align the completed upper substrate 210 and the completed lower substrate 110 in the alignment apparatus 300 shown in FIG. 2, a first substrate (e.g., the upper substrate 210) may be positioned in a similar position as the polarization element 330 in FIG. 1 (e.g., above substrate 110) and a second substrate (e.g., the lower substrate 110) may be positioned under the first substrate.

When the first substrate is fixed in position, the second substrate may be rotated and the luminance or the intensity of the light transmitted to the receiving unit 320 may be detected and measured. The center axis for rotating the second substrate may be parallel to the line connecting the source unit 310 and the receiving unit 320. The rotation axis may be perpendicular to the horizontal surface of the lower substrate 110 and the horizontal surface of the upper substrate 210.

When the luminance or the intensity of the light detected in the receiving unit 320 is largest, the transmissive axis of the upper polarizer 22 and the transmissive axis of the lower polarizer 12 are aligned with each other.

While it may be difficult to determine whether the transmissive axis of the upper polarizer 22 and the transmissive axis of the lower polarizer 12 are correctly aligned in any direction, the transmissive axis of the upper polarizer 22 and the transmissive axis of the lower polarizer 12 may be determined to be parallel to each other or perpendicular to each other through the measuring of the luminance or the intensity using the receiving unit 320. As a result, in a LCD with two polarizers 12 and 22 having the respective transmissive axes perpendicular to each other, the lower substrate 110 and the upper substrate 210 may be aligned and combined when the luminance or the intensity measured by the receiving unit 320 is a minimum. In a LCD with two polarizers 12 and 22 having transmissive axes parallel to each other, the lower substrate 110 and the upper substrate 210 are aligned and combined when the luminance or the intensity measured at the receiving unit 320 is a maximum.

After the lower substrate 110 and the upper substrate 210 are aligned and combined in a state in which the liquid crystal layer is not included, the liquid crystal layer may be injected. In addition, after setting a light path to not pass through the liquid crystal layer, the lower substrate 110 and the upper substrate 210 may be aligned and combined according to the luminance or the intensity measured at the receiving unit 320 after the liquid crystal layer is injected.

Accordingly, an alignment apparatus 300, such as the one shown in FIG. 2, may be used to combine two substrates of a LCD.

Next, a manufacturing method of a liquid crystal display according to exemplary embodiments of the invention will be described with reference to FIG. 3.

The LCD may include the upper substrate 210 and the lower substrate 110. A minute pattern may be formed on one surface of each of the lower substrate 110 and the upper substrate 210 by using a metal to complete a plurality of metal lines having the minute linear pattern (S10). The plurality of metal lines having the minute linear pattern forms the upper polarizer 22 and the lower polarizer 12.

To form the minute pattern, a metal layer may be deposited on an insulation substrate and a hard mask material may be formed thereon. A mold including the minute pattern may be pressed to transfer the minute pattern to the hard mask material. The metal layer may then be etched by the transferred hard mask to complete the plurality of metal lines of the minute linear pattern. The plurality of metal lines may be formed on the insulation substrate by pressing the mold without reference to the alignment such that the edge of the insulation substrate and a plurality of metal lines may be obliquely formed.

Figure 4:
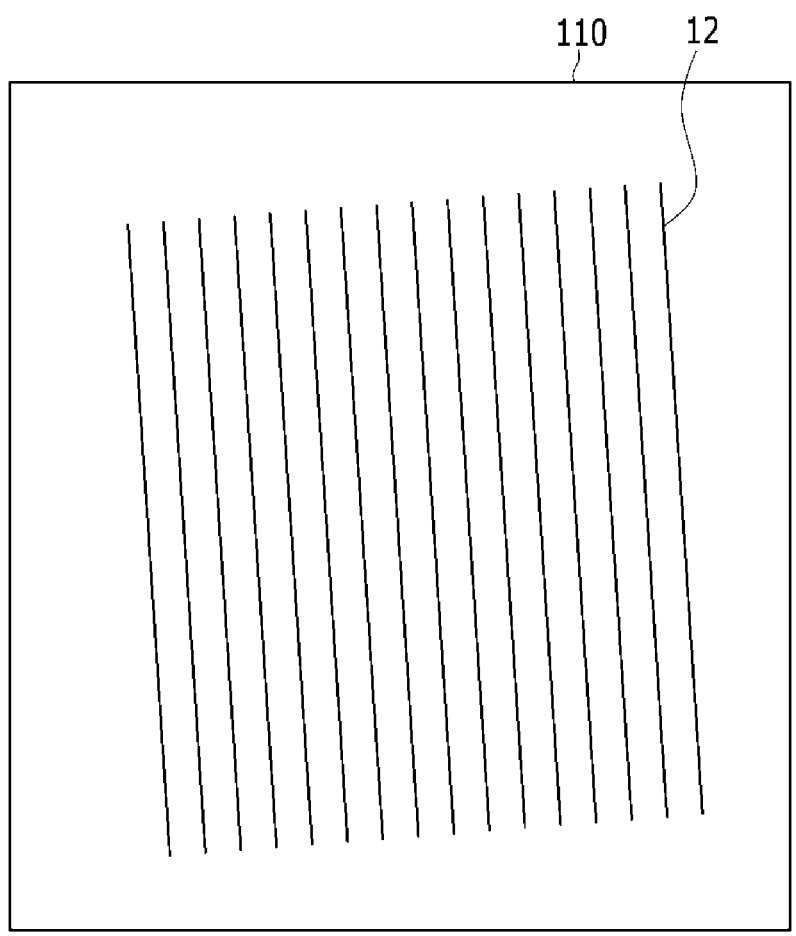
FIG. 4 is a view of a lower substrate including a minute linear pattern in exemplary embodiments of the invention.

FIG. 4 is a view of a lower substrate forming a minute linear pattern according to exemplary embodiments of the invention.

In FIG. 4, the insulation substrate is shown as the lower substrate 110 and a plurality of metal lines is shown as the lower polarizer 12. An angle between one edge of the lower substrate 110 and the extending direction of the metal lines included in the lower polarizer 12 may vary, and may, in some cases, be an acute angle. The metal lines may have a smaller width than the wavelength of the visible rays.

A pixel including wires or electrodes may be formed on the insulation substrate including the plurality of metal lines.

The extending direction of the plurality of metal lines and the extending direction of the overlying wires may not be parallel or perpendicular to each other, however a predetermined relationship may be established. For this purpose, it is necessary to check the extending direction of the plurality of metal lines, and as shown in FIG. 1, the extending direction of the plurality of metal lines may be determined using the alignment apparatus 300, and the wires and electrodes may be formed accordingly.

Figure 3:
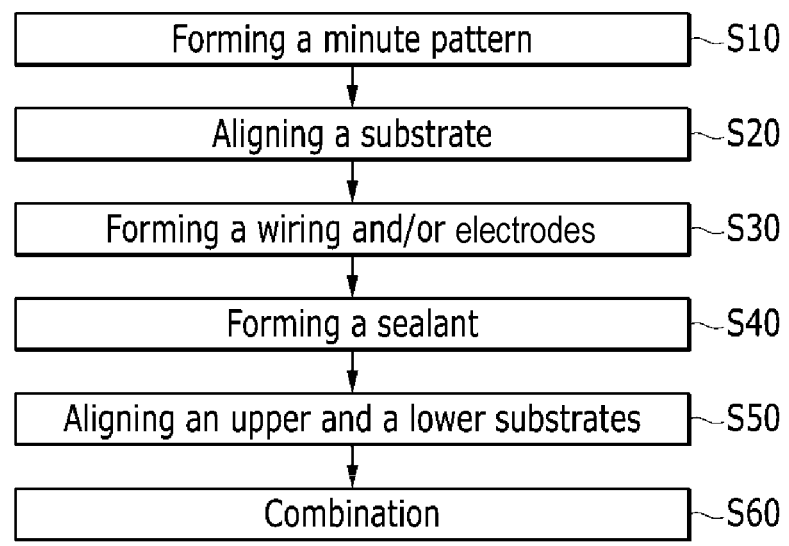
FIG. 3 is a flowchart of a manufacturing method of a liquid crystal display according to exemplary embodiments of the invention.

Referring to FIG. 3, the insulation substrate may be aligned using the alignment apparatus 300 shown in FIG. 1. To align the substrate, the extending direction of the plurality of metal lines may be determined according to the luminosity or intensity measured at the receiving unit 320 of the alignment apparatus 300.

Next, wires and/or electrodes may be formed based on the determined extending direction of the metal lines. The lower substrate 110 and the upper substrate 210 are completed by the formation of the wires and/or the electrodes based on the determined extending direction of the metal lines (S30).

In the lower substrate 110, the gate lines, the data lines, the thin film transistors, and the pixel electrodes are formed to be parallel or perpendicular to the extending direction of the plurality of metal lines or to have a predetermined angle based on the extending direction of the plurality of metal lines.

Figure 5:
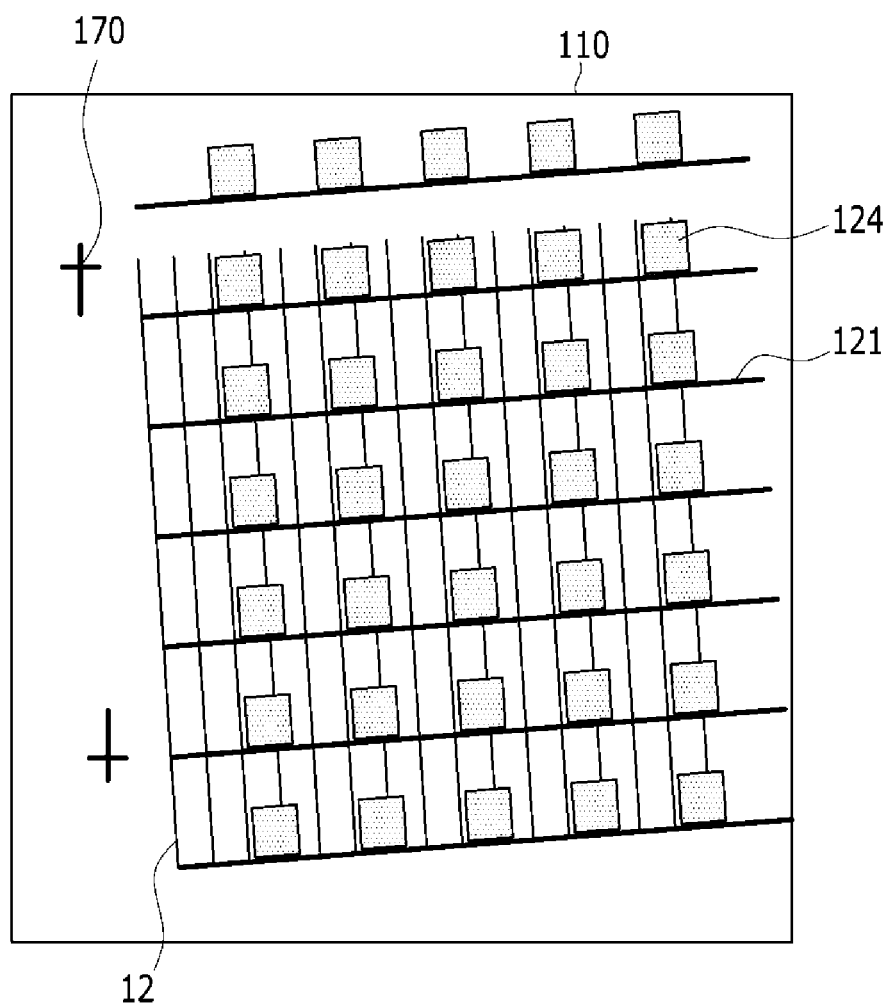
FIG. 5 is a view of forming additional wiring in the lower substrate of FIG. 4 according to exemplary embodiments of the invention.

FIG. 5 shows the lower substrate 110 with gate lines 121.

In FIG. 5, the gate line 121 may include a gate electrode 124 and may extend in a direction perpendicular to the plurality of metal lines of the lower polarizer 12. An alignment key 170 may be formed and may serve as a reference when the wires and/or the electrodes are formed. In some cases, the alignment key 170 may be formed such that the extending direction of the metal line does not have to be considered. This is because the alignment may change while rotating the insulation substrate such that an error may be maximally reduced by generating the aligning key while forming the pattern directly after confirming the extending direction of the metal lines. Also, the alignment apparatus 300 is included in an exposure apparatus and may be formed together as one device so that the further errors may not be generated while moving the insulation substrate. This will be described in further detail in FIG. 10.

Referring back to FIG. 5, data lines perpendicular to the gate line 121 may be formed on the lower substrate 110, and a thin film transistor and the pixel electrode may be formed based on the alignment key 170.

The upper substrate 210 will be described hereinafter.

After confirming the extending direction of the plurality of metal lines included in the upper polarizer 22, a color filter may be formed under the upper polarizer 22 based on the extending direction. An alignment key 170 may also be formed in the upper substrate 210.

Color filters of various colors, a light blocking member, and a common electrode may be formed based on the alignment key 170.

Through the above processes, the lower substrate 110 and the upper substrate 210 are respectively completed.

Next, a sealant may be formed on at least one side of the substrate (S40).

The sealant fixes the lower substrate 110 to the upper substrate 210.

Subsequently, the lower substrate 110 and the upper substrate 210 may be aligned using the alignment apparatus 300 (S50).

One of the upper substrate 210 and the lower substrate 110 may be fixed while the other substrate is rotated with respect to the rotation axis for alignment purposes (i.e., to align the substrates 110 and 220 based on when the luminosity and intensity value measured at the receiving unit 320 is a maximum value or a minimum value.

After aligning the lower substrate 110 and the upper substrate 210, the lower substrate 110 and the upper substrate 210 may be combined (S60).

The combined upper and lower substrates 110 and 210 may be fixed by the sealant.

A LCD may be formed by injecting a liquid crystal layer between the combined upper substrate 210 and lower substrate 110. The liquid crystal layer may be injected by forming a liquid crystal injection hole at one side of the sealant and injecting the liquid crystal.

In some cases, after completing the upper substrate 210 and the lower substrate 110, the liquid crystal layer may be disposed on one of the substrates 110 and 210. The upper substrate 210 and the lower substrate 110 may then be aligned and combined. When aligning the upper substrate 210 and the lower substrate 110, an electromagnetic signal transmitted from the source unit 310 may not passed through the liquid crystal layer to reach the light receiving unit 320. To address this, a portion having a pattern that is parallel to and the same as the plurality of metal line may be further formed at one side of the upper substrate 210 and the lower substrate 110. Such a process will be described in further detail with reference to FIG. 9.

As shown in FIG. 2, the upper substrate 210 and the lower substrate 110 may be aligned when a polarizer including a plurality of metal lines is formed on both the upper substrate 210 and the lower substrate 110. In some cases, when a polarization film is attached to only one substrate, the upper substrate 201 and the lower substrate 110 may be combined in the manner described with reference to FIG. 2, however the polarization film may be attached after the combination.

The above alignment apparatus 300 and the manufacturing method of the liquid crystal display may be applied to the case of using a plurality of metal lines in a polarizer.

Next, how a contrast ratio of a LCD is changed by misalignment of the substrates 110 and 220 when using a plurality of metal lines as the polarizer will be described with reference to FIGS. 6, 7, and 8.

Figure 6:
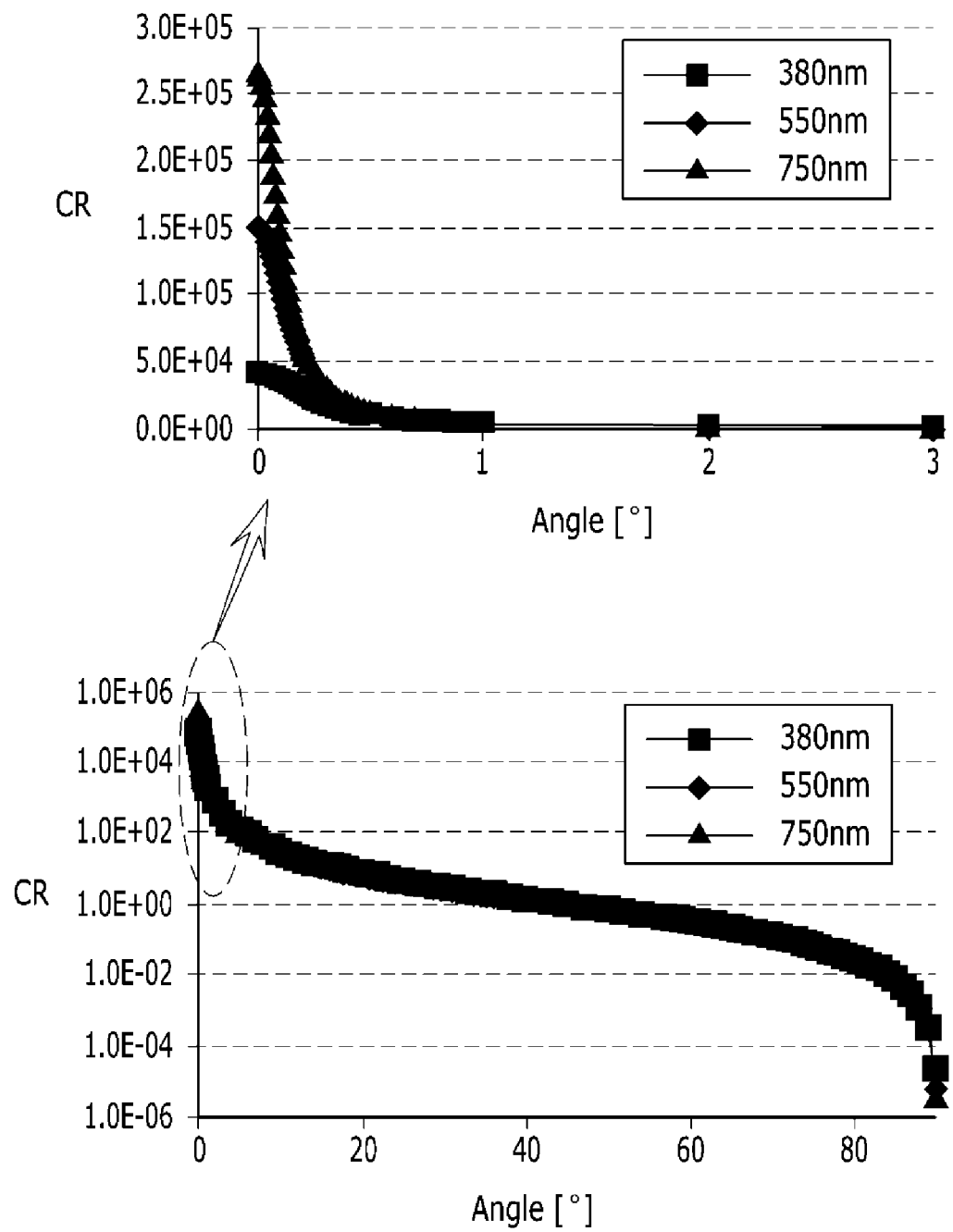
FIGS. 6, 7, and 8 are graphs of a contrast ratio according to a misalignment according to exemplary embodiments of the invention.
Figure 7:
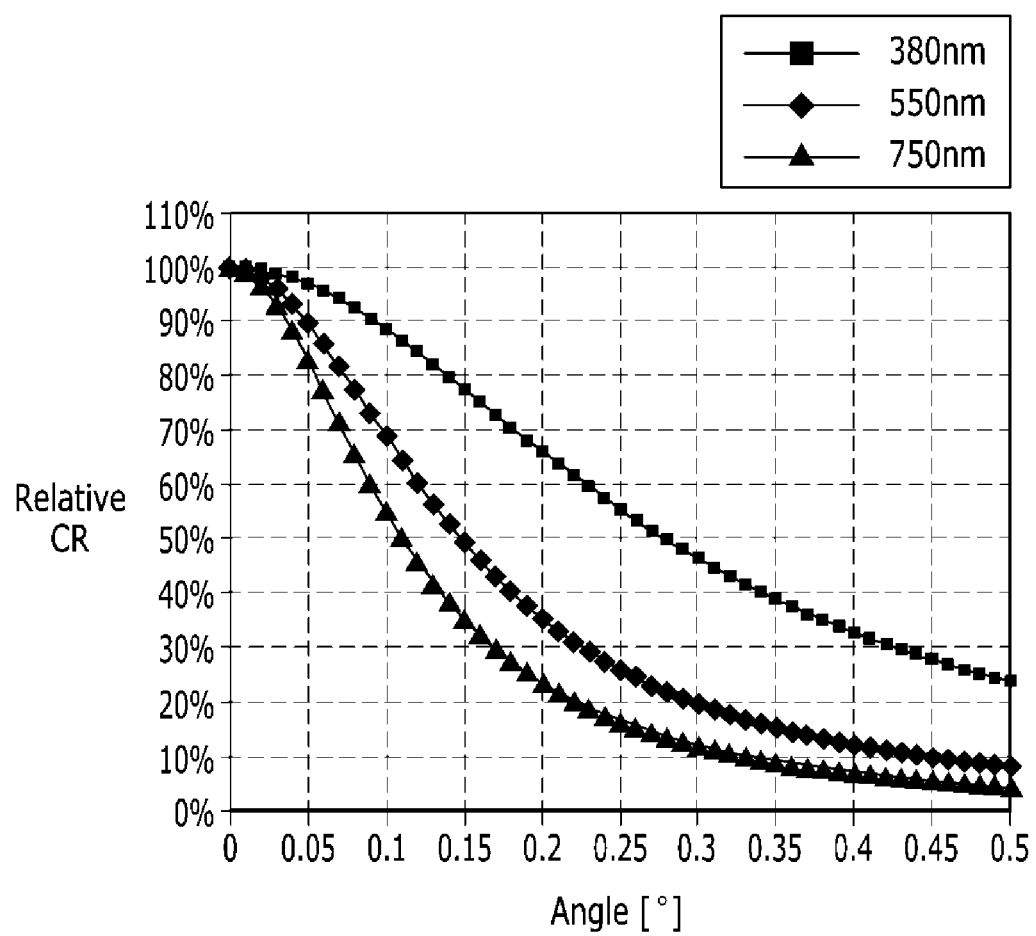
Figure 8:
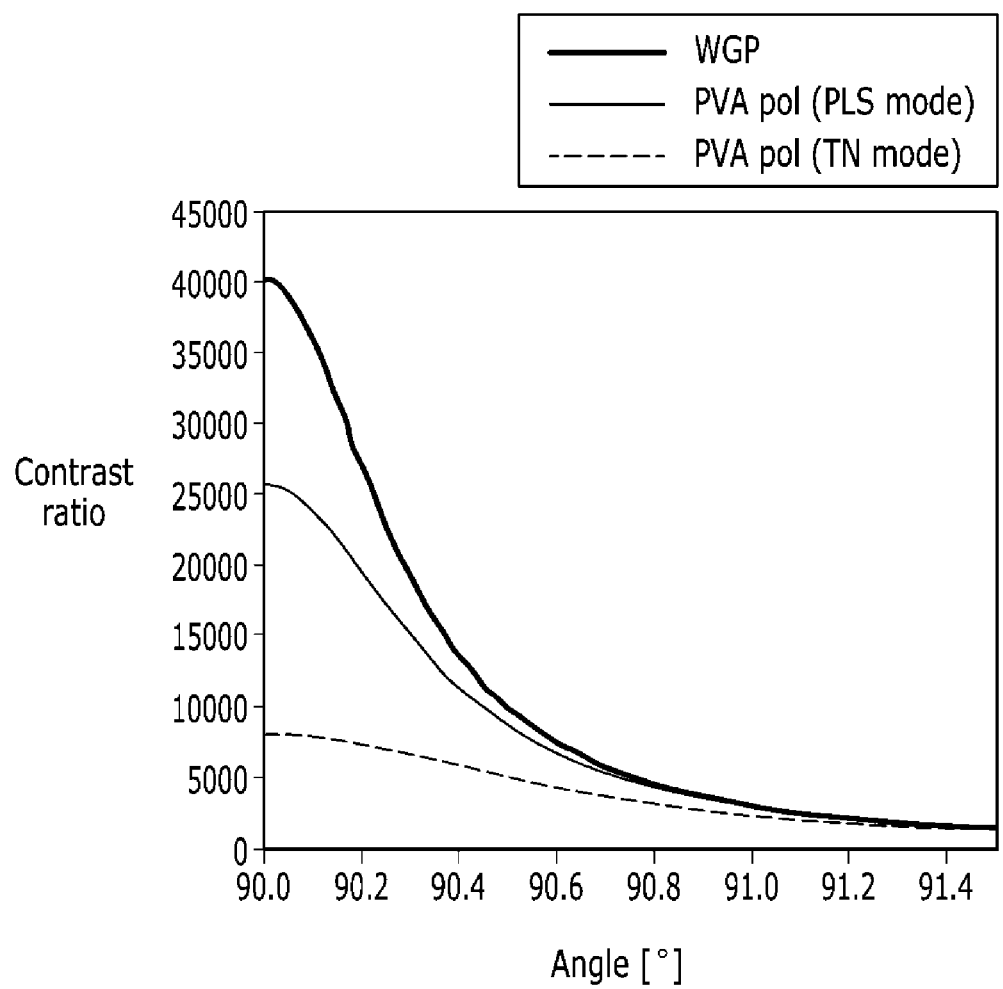

FIGS. 6, 7, and 8 are graphs showing a contrast ratio according to the misalignment.

FIG. 6 shows a reduction of the contrast ratio (CR) according to the misalignment angle for a light of 380 nm, 550 nm, and 750 nm.

As shown in FIG. 6, the contrast ratio may significantly decrease at a misalignment angle of approximately 0.5 degrees.

Therefore, in the liquid crystal display using a plurality of metal lines in a polarizer, the misalignment is a factor that generates a serious problem. Accordingly, it is important to minimize and/or prevent misalignment.

FIG. 7 shows a change in the contrast ratio according to the angle after uniformly making a maximum value of the contrast ratio for each wavelength band of 380 nm, 550 nm, and 750 nm. As can be seen in FIG. 7, the decrease in contrast ratio is greater at higher wavelengths. In display device that display all colors, it is important not to have misalignment since even a slight decrease in the light of any wavelength may result in significant reduction in the image quality.

FIG. 8 compares the contrast ratio due to a misalignment when using a plurality of metal lines as the polarizer (e.g., wire grid polarizer (WGP)) and when using a polarization film (PVA).

When using the polarization film, the liquid crystal layer may be rotated by a horizontal electric field (PLS mode) or may be arranged in a vertical direction according to a vertical electric field (TN mode).

Also, in FIG. 8, 90 degrees is the angle at which misalignment is not generated.

Referring to FIG. 8, when a misalignment of 1 degree is generated while using a WGP, the contrast ratio decreases by about 4500. When using a polarization film, the contrast ratio decreases by about 2000 in the PLS mode and by about 200 in the TN mode at a misalignment of 1 degree. Accordingly, FIG. 8 shows that the decrease in contrast ratio generated by a misalignment is smaller when using the polarization film relative to when using a plurality of metal lines as the polarizer.

The misalignment in LCDs using a plurality of metal lines as polarizers may, however, be reduced using the alignment apparatus 300 and the manufacturing method of a LCD described hereinabove.

Figure 9:
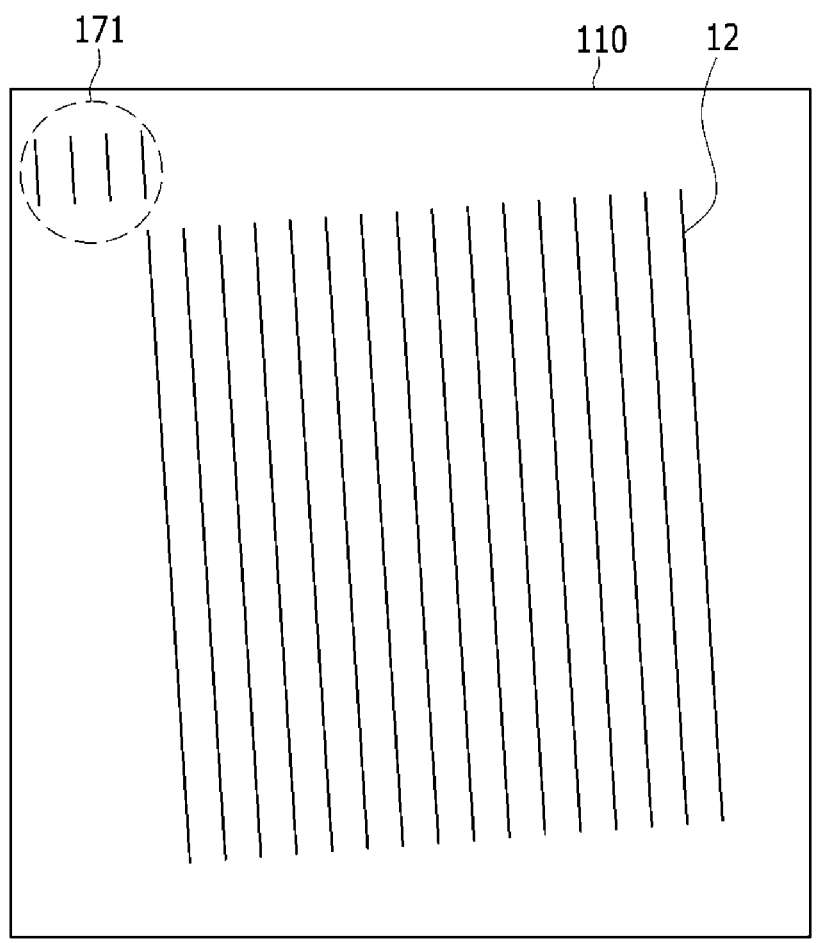
FIG. 9 is a view of a lower substrate including a minute linear pattern according to exemplary embodiments of the invention.

The alignment apparatus 300 may also align a substrate as shown in FIG. 9.

FIG. 9 is a view of a lower substrate 110 including a minute linear pattern according to exemplary embodiments of the invention.

The lower substrate 110 shown in FIG. 9 includes a minute linear pattern key 171 and a lower polarizer 12 including a plurality of metal lines having the minute linear pattern.

The minute linear pattern key 171 may be positioned outside the display area, may have the same pattern as the minute linear pattern of the plurality of metal lines included in the lower polarizer 12, and may be formed with the same material. The minute linear pattern key 171 may include a plurality of metal lines, however a length thereof is shorter than the plurality of metal lines included in the lower polarizer 12. The width of the metal lines and the interval of the metal lines may be the same as the width and metal lines of the plurality of metal lines included in the lower polarizer 12. Also, the metal lines of the minute linear pattern key 171 and the plurality of metal lines included in the lower polarizer 12 are parallel to each other.

As a result, although electromagnetic waves may be irradiated from the source unit 310 to the minute linear pattern key 171, the same result as the irradiation to the plurality of metal lines of the lower polarizer 12 may be obtained.

Therefore, by adding a pattern corresponding to the minute linear pattern key 171 to the mold forming a plurality of metal lines of the lower substrate 110, the minute linear pattern key 171 and the plurality of metal lines may be formed together.

Figure 10:
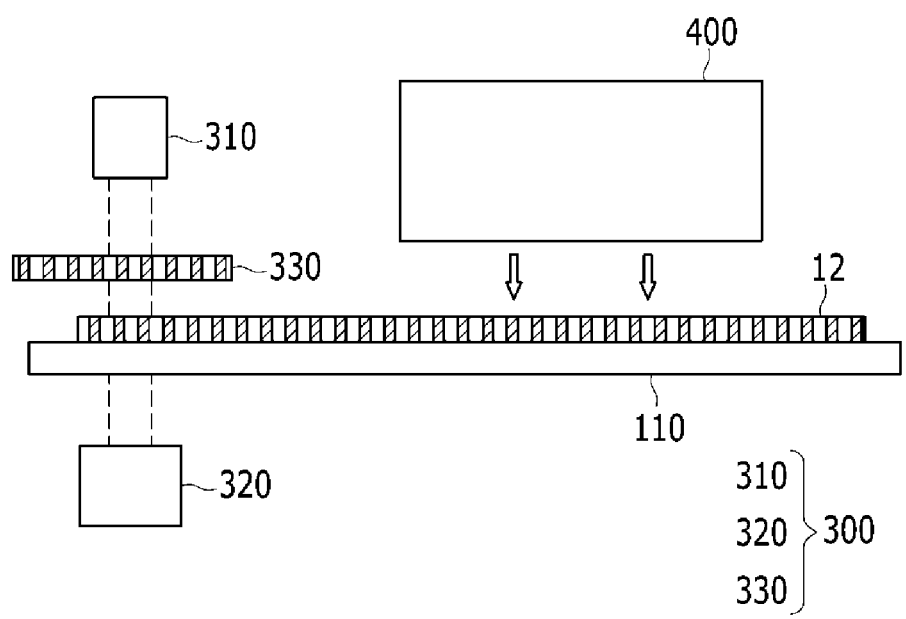
FIG. 10 is a view of an exposure apparatus according to exemplary embodiments of the invention.

The substrate of FIG. 9 is further useful in a case that the alignment apparatus 300 and an exposure apparatus are formed into one, as illustrated in FIG. 10.

FIG. 10 is a view of an exposure apparatus according to exemplary embodiments of the invention.

The exposure apparatus of FIG. 10 may include an exposure unit 400 and an alignment apparatus 300.

The alignment apparatus 300 may be formed along with the exposure unit 400 such that the lower substrate 110 is rotated by the alignment apparatus 300 with respect to the rotation axis to be aligned and then the thin film formation process of the wires and/or the electrodes may be performed through the exposure unit 400 without movement of the lower substrate 110.

The exposure apparatus 400 and alignment apparatus 300 in FIG. 10 have an advantage in that no misalignment is generated when the lower substrate 110 is moved.

In FIG. 10, the minute linear pattern key 171 is not additionally formed like in FIG. 9, and the plurality of metal lines included in the lower polarizer 12 are formed to be extended outside the display area thereby performing a function of the minute linear pattern key. The display area is a region where the pixel with which the LCD displays the image is positioned, and a region where the image is not displayed is not included in the display area.

While FIG. 10 shows the exposure unit 400, a mask including a pattern such as the wires or the electrodes may also be used. To form the pattern such as the wires or the electrodes, a developing process may be performed after exposure.

It will be apparent to those skilled in the art that various modifications and variations can be made in the invention without departing from the spirit or scope of the invention. Thus, it is intended that the invention cover the modifications and variations of this invention provided they come within the scope of the appended claims and their equivalents.

What is claimed is:
1. An apparatus comprising:
a source unit to provide an electromagnetic signal;
a receiver to receive the electromagnetic signal;
a polarization element disposed between the source unit and the receiver and spaced apart from a substrate, the polarization element having a transmissive axis in a first direction, the polarization element is configured to be fixed while the substrate is rotated;
a polarizer comprising metal lines and disposed on the substrate; and
an exposure unit adjacent to the source unit,
wherein the substrate is disposed between the source unit and the receiver,
wherein the receiver is configured to receive the electromagnetic signal passed through the polarization element and the metal lines of the polarizer on the substrate, wherein at least one of a luminance and an intensity of the electromagnetic signal received by the receiver is configured to be determined when the substrate is rotated, wherein the apparatus is configured to inspect an extending direction of the metal lines of the polarizer on the substrate by the determined result of the at least one of the luminance and an intensity of the electromagnetic signal received by the receiver, and wherein the exposure unit is configured to perform a thin film process on the substrate while alignment of the substrate is maintained.

2. The apparatus of claim 1, wherein:

the substrate is rotated with respect to a line connecting the source unit and the receiver or with respect to a rotation axis parallel to a path of the electromagnetic signal from the source unit to the receiver.

3. The apparatus of claim 1, wherein:

the polarization element comprises a polarization film comprising polyvinyl alcohol or comprises metal lines having a smaller interval than a wavelength of visible light.

4. The apparatus of claim 1, wherein:

the substrate comprises a linear pattern key comprising metal lines; and the metal lines of the linear pattern key are shorter than the metal lines of the polarizer, have the same width and the same interval as the metal lines of the polarizer, comprise the same material as the metal lines of the polarizer, and are parallel to the metal lines of the polarizer.

* * * * *